US011969388B2

(12) United States Patent
Taylor

(10) Patent No.: US 11,969,388 B2
(45) **Date of Patent: *Apr. 30, 2024**

(54) SELF-MASSAGE ROLLER AND BOTTLE

(71) Applicant: Lani Taylor, Venice, CA (US)

(72) Inventor: Lani Taylor, Venice, CA (US)

( * ) Notice: Subject to any disclaimer, the term of this patent is extended or adjusted under 35 U.S.C. 154(b) by 846 days.

This patent is subject to a terminal disclaimer.

(21) Appl. No.: 17/075,565

(22) Filed: Oct. 20, 2020

(65) Prior Publication Data

US 2021/0030619 A1 Feb. 4, 2021

Related U.S. Application Data

(63) Continuation-in-part of application No. 15/827,310, filed on Nov. 30, 2017, now Pat. No. 10,842,709, (Continued)

(51) Int. Cl.
*A61H 15/00* (2006.01)
*A47G 19/22* (2006.01)

(52) U.S. Cl.
CPC ..... *A61H 15/0092* (2013.01); *A47G 19/2227* (2013.01); *A61H 2015/0014* (2013.01); (Continued)

(58) Field of Classification Search
CPC .... A61H 2015/0014; A61H 2201/1284; A61H 2201/1695; A61H 2201/1253; (Continued)

(56) References Cited

U.S. PATENT DOCUMENTS 5,022,562 A 6/1991 Lurkis et al.
5,143,056 A * 9/1992 Yih-Jong ............... B62K 21/26 601/118

(Continued)

FOREIGN PATENT DOCUMENTS

CN 201888519 U 7/2011
CN 202822005 U 3/2013

(Continued)

OTHER PUBLICATIONS

Wagner, T., "Stainless Steel Water Bottles: Everything You Need to Know" Article, Sustainable Baby Steps, Jul. 30, 2012, pp. 1-3, United States [downloaded from URL:http:/web.archive.orgjweb/20120730020305/http://www.sustainablebabysteps.comjstainless-steel-water-bottles.html on Jun. 12, 2017].

(Continued)

*Primary Examiner* — Bradley H Philips
*Assistant Examiner* — Savannah L Gabriel
(74) *Attorney, Agent, or Firm* — Sherman IP LLP; Kenneth L. Sherman; Hemavathy Perumal

(57) ABSTRACT

A self-massage roller having a bottle, a covering, and, optionally, a removable cap. The bottle provides a vessel for holding liquids. The covering includes a base layer and a plurality of nubs. The base layer overlays the outer surface of the bottle. Each nub in the plurality of nubs protrudes from the base layer in a direction radially away from the outer surface of the bottle. Each nub is a massage element, and the plurality of nubs forms a textured surface for myofascial release of certain muscles of the user. In another version, each nub is attached directly to the outer surface of the bottle without an intervening base layer. In versions with a cap, the cap may include a flip-up spout, or it may have a plunger valve that opens upon pulling the plunger outward and closes upon pushing in the plunger.

12 Claims, 12 Drawing Sheets

Related U.S. Application Data which is a continuation of application No. 14/304,759, filed on Jun. 13, 2014, now Pat. No. 9,861,551.

(60) Provisional application No. 61/875,696, filed on Sep. 10, 2013.

(52) U.S. Cl.
CPC ................ *A61H 2201/1284* (2013.01); *A61H 2201/1695* (2013.01)

(58) Field of Classification Search
CPC .... A61H 15/00; A61H 15/0092; A61H 1/006; A47G 19/2227
See application file for complete search history.

(56) References Cited

U.S. PATENT DOCUMENTS

| | | | | |
|---|---|---|---|---|
| 5,873,478 | A | 2/1999 | Sullivan et al. | |
| 6,129,687 | A * | 10/2000 | Powell | A61H 15/02 220/666 |
| 6,354,458 | B1 | 3/2002 | Policappelli | |
| 6,419,650 | B1 * | 7/2002 | Ryan | A61H 39/04 601/19 |
| D471,636 | S | 3/2003 | Yu et al. | |
| 8,181,816 | B2 | 5/2012 | Allen | |
| D693,934 | S | 11/2013 | Lin | |
| 9,005,146 | B2 | 4/2015 | Phillips | |
| 9,861,551 | B2 | 1/2018 | Taylor | |
| 2003/0010744 | A1 | 1/2003 | Ma et al. | |
| 2003/0225352 | A1 | 12/2003 | Eckers et al. | |
| 2004/0243036 | A1 | 12/2004 | Ma et al. | |
| 2005/0015032 | A1 | 1/2005 | Stein | |
| 2006/0000277 | A1 | 1/2006 | Pietrorazio et al. | |
| 2007/0129654 | A1 | 6/2007 | Anderson, Jr. | |
| 2008/0200851 | A1 * | 8/2008 | Faussett | A61H 15/0092 601/118 |
| 2009/0112137 | A1 | 4/2009 | Lamore | |
| 2010/0193390 | A1 | 8/2010 | Moretti | |
| 2012/0094261 | A1 | 4/2012 | Hayn et al. | |
| 2012/0277077 | A1 | 11/2012 | Hsu et al. | |
| 2013/0090220 | A1 * | 4/2013 | Bertram | A61H 7/00 482/139 |
| 2013/0096472 | A1 | 4/2013 | Bertram et al. | |
| 2013/0310234 | A1 | 11/2013 | Miller, Jr. | |

FOREIGN PATENT DOCUMENTS

| | | | |
|---|---|---|---|
| CN | 203107615 | U | 8/2013 |
| CN | 104706512 | B | 4/2019 |
| CN | 110025464 | A | 7/2019 |
| DE | 20012671 | * | 1/2001 |
| HK | 40009065 | A | 6/2020 |
| TW | 201906593 | A | 2/2019 |
| TW | I650115 | B | 2/2019 |
| WO | 2015038541 | A1 | 3/2015 |

OTHER PUBLICATIONS

Extended European Search Report dated Jun. 12, 2017 for European Application No. 14844367.4 from European Patent Office, pp. 1-10, Munich, Germany.
Facebook, Website of Photo I: https://www.facebook.com/mobotnation/photos/a.688084361202865.1073741829.685872111424090/688084257869542/?type=3&theater, Publication date of Photo I: Nov. 9, 2013.
Facebook, Website of Photo II: https://www.facebook.com/mobotnation/photos/a.688084361202865.1073741829.685872111424090/693169627361005/?type=3&theater, Publication date of Photo II: Nov. 17, 2013.
Supplemental European Search Report dated Jul. 11, 2017 for European Application No. 14844367.4 from European Patent Office, pp. 1, Munich, Germany.
Chinese Office Action dated Sep. 28, 2017 for Chinese Patent Application No. 201410459138.8 from Chinese Patent Office, pp. 1-9, Beijing, China.
Chinese Office Action dated May 23, 2018 for Chinese Patent Application No. 201410459138.8 from Chinese Patent Office, pp. 1-6, Beijing, China.
Chinese Notice of Allowance dated Dec. 25, 2018 for Chinese Patent Application No. 201410459138.8 from Chinese Patent Office, pp. 1-7, Beijing, China.
ROC (Taiwan) Office Action dated May 30, 2018 for ROC (Taiwan) Patent Application No. 103131219 from ROC (Taiwan) Patent Office, pp. 1-11, Beijing, China.
ROC (Taiwan) Notice of Allowance dated Oct. 11, 2018 for ROC (Taiwan) Patent Application No. 103131219 from ROC (Taiwan) Patent Office, pp. 1-3, Beijing, China.
European Office Action dated Oct. 16, 2019 for European Application No. 14844367.4 from European Patent Office, pp. 1-5, Munich, Germany.
European Office Action dated May 12, 2020 for European Application No. 14844367.4 from European Patent Office, pp. 1-5, Munich, Germany.
ROC (Taiwan) Office Action & Search Report dated Dec. 26, 2019 for ROC (Taiwan) Patent Application No. 103131219 from ROC (Taiwan) Patent Office, pp. 1-12, Taiwan, R.O.C (English-language translation included pp. 1-5).
U.S. Non-Final Office Action for U.S. Appl. No. 14/304,759 dated Dec. 14, 2015.
U.S. Final Office Action for U.S. Appl. No. 14/304,759 dated Jun. 29, 2015.
U.S. Non-Final Office Action for U.S. Appl. No. 14/304,759 dated Jan. 27, 2017.
U.S. Notice of Allowance for U.S. Appl. No. 14/304,759 dated Aug. 30, 2017.
U.S. Corrected Notice of Allowability for U.S. Appl. No. 14/304,759 dated Sep. 25, 2017.
U.S. Non-Final Office Action for U.S. Appl. No. 15/827,310 dated Mar. 16, 2020.
U.S. Notice of Allowance for U.S. Appl. No. 15/827,310 dated Jul. 15, 2020.
Chinese Office Action dated Jan. 11, 2021 for Chinese Patent Application No. 201910180953.3 from Chinese Patent Office, pp. 1-3, Beijing, China.
Chinese Office Action dated Dec. 6, 2021 for Chinese Patent Application No. 201910180953.3 from Chinese Patent Office, pp. 1-8, Beijing, China.

* cited by examiner

SELF-MASSAGE ROLLER AND BOTTLE

CROSS REFERENCE TO RELATED APPLICATIONS

This application is a continuation-in-part of U.S. Non-Provisional patent application Ser. No. 15/827,310, filed on Nov. 30, 2017, which in turn is a continuation of U.S. Non-Provisional patent application Ser. No. 14/304,759, filed on Jun. 13, 2014, which in turn claims priority to U.S. Provisional Patent Application Ser. No. 61/875,696, filed on Sep. 10, 2013, all incorporated herein by reference.

TECHNICAL FIELD

This invention relates to the field of exercise and mobility products, more particularly to bottles having exterior padding, and that are configured and adapted to function both as a vessel for holding liquids for consumption by a user and as a roller for myofascial flexibility and muscle tension release for the user.

BACKGROUND ART

Myofascial rollers have become an important piece of equipment in the field of exercise and mobility. Use of a foam roller provides numerous benefits to its user in terms of flexibility and decreasing muscle tension. A foam roller also can be used in warm up and recovery. Currently available rollers are normally large in size, causing portability problems. Typically, a person's equipment bag or usual carrying case or purse is very full with numerous items that one wishes to carry. And carrying around, in addition, an oversized foam roller is a problem for many.

Conventional rollers are normally cylindrical in shape and constructed from a variety of foams. As used in the field of exercise, a bottle is a vessel typically used for rehydration during or after exercise. Rehydration is extremely important for people's health and wellbeing.

Embodiments of the presently described self-massage roller and bottle solve problems associated with the conventional, relatively large, foam roller products by providing a drink bottle with a foam roller covering, and a lid having an easy pour spout. The presently described self-massage roller and bottle can be taken wherever the user requires hydration and myofascial release.

The self-massage roller and bottle is a single device with structures that provide for combined rehydration and myofascial release. As such, it serves to remind people to do both. With its relatively small size, it is convenient and can be taken virtually anywhere. And the integrated design saves space in the user's equipment bag, carrying case, or purse.

The presently described self-massage roller and bottles can be made in a variety of sizes, shapes and configurations; can have any of a variety of coverings made from different types of foams or to other materials; and the coverings can have any of a variety of surface configurations. Embodiments of the presently described self-massage roller and bottles can be manufactured in a range of sizes and can have different shapes, styles, and densities of foam coverings.

DISCLOSURE OF INVENTION

Embodiments of the present invention combine the traditional benefits of a foam roller with the traditional benefits of hydration by using a drink bottle. The invention uses a bottle as the core of the roller. The bottle is a vessel for liquid rehydration and also provides a very strong core for functioning as a foam roller.

Accordingly, one aspect of the invention can be viewed as a self-massage roller with bottle. This self-massage roller has a bottle and a covering. In versions of the invention, the self-massage roller with bottle also includes a removable cap. The bottle has a body, a bottom, and a top. The body has an outer surface, a top end, and a bottom end. The bottom closes the bottom end of the body. The top is at the top end of the body and allows access to the interior of the bottle.

The bottle is preferably formed from type-304 stainless steel having a wall thickness of 0.5 mm to provide strength sufficient to carry or support great weight needed for use in myofascial release. In some embodiments, the top includes a neck, which may be threaded to mate with a threaded cap.

In one version, the covering includes a base layer and a plurality of nubs. The base layer overlays the outer surface of the body. Preferably, the covering is relatively tightly positioned around a significant portion of the body and extends along the body for a significant portion of its top-to-bottom length. Each nub in the plurality of nubs protrudes from the base layer in a direction radially away from the outer surface of the body. Each nub is a massage element, and the plurality of nubs forms a textured surface for myofascial release of certain muscles of the user. Preferably, each nub is made of relatively dense synthetic foam, such as ethylene vinyl acetate (EVA).

In a version of the invention, the covering is applied to the bottle by way of a hot press mold and glue. In an embodiment, each nub is attached directly to the outer surface of the bottle without an intervening base layer.

In versions with a cap, the cap may include a flip-up spout, or it may have a plunger valve that opens upon pulling the plunger outward and closes upon pushing in the plunger. Other known designs are also suitable.

BEST MODE FOR CARRYING OUT THE INVENTION

Figure 1:
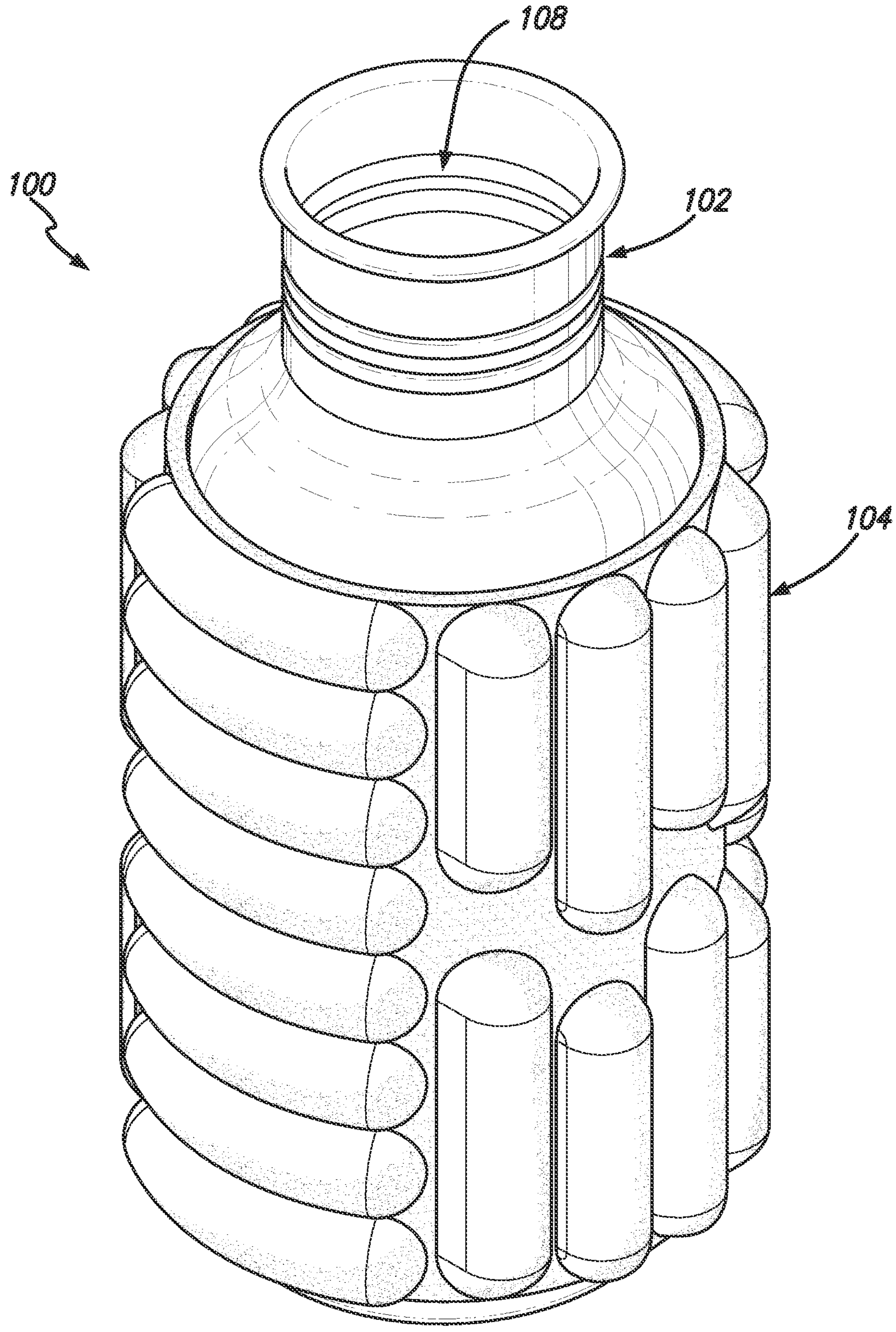
FIG. 1 is a perspective view of an embodiment of a Self-Massage Roller and Bottle.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

By also referring to the drawings, the present invention is directed to a self-massage roller with bottle 100. The self-massage roller with bottle 100 has a bottle 102 and a covering 104. In versions of the invention, the self-massage roller with bottle 100 also includes a cap 106, which is preferably removable.

The bottle 102 has a body 110, a bottom 112, and a top 114. The body 110 has an outer surface 116, a top end 118, and a bottom end 120. The bottom 112 closes the bottom end 120 of the body 110. The top 114 is at the top end 118 of the body 110 and allows access to the interior 108 of the bottle 102. The body 110, the bottom 112, and the top 114 form the bottle 102, with access to the interior 108 of the bottle 102 through the top 114.

The bottle 102 is preferably formed from type-304 stainless steel having a wall thickness of 0.5 mm to provide sufficient strength to carry or support great weight needed for use in myofascial release. This wall thickness provides a bottle 102 that is stronger and more durable than the typical 0.3 mm to 0.4 mm thicknesses present in other steel bottles. However, other materials and thicknesses can be used if they provide sufficient strength to permit the bottle 102 to function as a myofascial release device, and if they can be used for bottles that contain liquids for human consumption. For example, the bottle 102 may be fashioned from synthetic fibers or synthetic composites. Preferably, the bottle 102 does not include Bisphenol A (BPA). In a version of the invention, the body 110 is a cylinder, and it may be a right circular cylinder. In some embodiments, the top 114 includes a neck 130, which is threaded in some versions. In some versions, the top 114 includes a tapered region 132, and the tapered region 132 joins the top end 118 of the body 110 to the neck 130.

The bottle 102 provides a vessel to carry rehydration liquid, such as water, energy drinks, protein shakes, and healthy green smoothies. The bottle 102 can vary in size, shape, and volume of capacity as long as it can be used as a myofascial release device and contain liquids for human consumption. The presently preferred volumes of capacity are 12, 18, 27, and 40 ounces. The dimensions vary with the embodiment, but a bottle 102 having a capacity of about eighteen ounces typically has a bottle height 142 of 180 mm (about 7.1 inches), a body diameter 144 of 72.5 mm (about 2.9 inches), a top height 146 of 44 mm, and a neck diameter 148 of 44 mm.

The covering 104 includes a base layer 122 and a plurality of nubs 124. The base layer 122 overlays the outer surface 116 of the body 110. Preferably, the covering 104 is relatively tightly positioned around a significant portion of the body 110 and extends along the body 110 for a significant portion of its top-to-bottom length. In general the covering 104 extends over more than half of the length of the body 110 to provide sufficient surface area to contact a user's leg during use. Each nub in the plurality of nubs 124 protrudes from the base layer 122 in a direction radially away 126 from the outer surface 116 of the body 110. Each nub is a massage element, and the plurality of nubs 124 forms a textured surface 128 for myofascial release of certain muscles of the user. In some versions of the invention, the plurality of nubs 124 is at least fifteen nubs distributed about the base layer 122.

Preferably, each nub is made of relatively dense synthetic foam. Most preferably, the synthetic foam is ethylene vinyl acetate (EVA). However, materials of different densities can be used to offer the user a range of different massages for myofascial release by providing a relatively harder or softer feel. For example, the base layer 122 or the plurality of nubs 124 could be made from natural or synthetic rubber, including recycled rubber. It is also contemplated that materials with different densities may be used within a single self-massage roller with bottle 100 to provide a range of massages as the user rotates the self-massage roller with bottle 100.

While the surface texture and pattern for the plurality of nubs 124 may vary, the presently preferred embodiments are shown in the accompanying figures. The various surface textures and patterns offer the user a range of different massages. In some embodiments, each nub has a radial cross-section that is semi-elliptical 138. This includes cross-sections that semi-circular. In other embodiments, each nub has a radial cross-section that is trapezoidal 140. In yet another version, each nub has a radial cross-section that is semi-circular and each nub is arranged longitudinally on the outer surface 116, extending from near the top end 118 to near the bottom end 120 of the body 110. That embodiment was depicted in Provisional Application No. 61/875,696.

In the presently preferred embodiment where each nub has a radial cross-section that is semi-elliptical 138, the nub radius 150 preferably is between 7.0 mm (about 0.28 inches) and 8.5 mm (about 0.33 inches), and the nub length 152 preferably is between 49.5 mm to 59.5 mm. In the presently preferred embodiment where each nub has a radial cross-section that is trapezoidal 140, the nub length 154 preferably is 20 mm (about 0.79 inches) or 41 mm (about 1.6 inches), the nub width 156 preferably is 20 mm (about 0.79 inches), and the nub width 158 preferably is 7.0 mm (about 0.28 inches).

In a version of the invention, the covering 104 is applied to the bottle 102 by way of a hot press mold and glue. In an embodiment, each nub is attached directly to the outer surface 116 of the bottle 102 without an intervening base layer 122.

In versions with a cap 106, the cap 106 may include a flip-up spout 134, or it may have a plunger valve 136 that opens upon pulling the plunger outward and closes upon pushing in the plunger. Examples are shown in the Figures. Other spout designs are also effective, but the cap 106 preferably is a flip-up spout 134 made of BPA-free plastic. The cap 106 mates with the neck 130 to close the top 114 of the bottle 102.

The bottle 102 and cap 106 provide two methods of delivering liquid to the user. One is by completely unscrewing the cap 106 to remove it. The individual user can then drink directly from the top 114 of the bottle 102 or pour the liquid into another container, such as a cup. The second method, which provides faster access, is to use the flip-up spout 134 or another spout design. This is ideal for people who, for example, are exercising. Such people typically require a quick drink so they can continue their exercise. The bottle 102 can sit on its bottom 112, or lie down on its side outer surface 116.

Preferably, during non-use the self-massage roller with bottle 100 is intended to stand upright on its bottom 112, although it may be placed inside of carrying cases; so the orientation will vary. When used for myofascial release the self-massage roller with bottle 100 is placed on its side outer surface 116, horizontally on the floor or other surface. The user rolls the self-massage roller with bottle 100 on its side outer surface 116 on the floor, and has the user's body part (for example, a leg) positioned on top of at least a portion of the plurality of nubs 124. The user may press downward to increase the pressure applied to the body part, or the user may simply roll the self-massage roller with bottle 100 along the body part so that only gravity pressure is applied. In one aspect of use, the pressure is applied to the body part through the user rolling on the self-massage roller with bottle 100 and using the user's body weight to generate pressure on the body part(s) that contact the self-massage roller with bottle 100.

Figure 2:
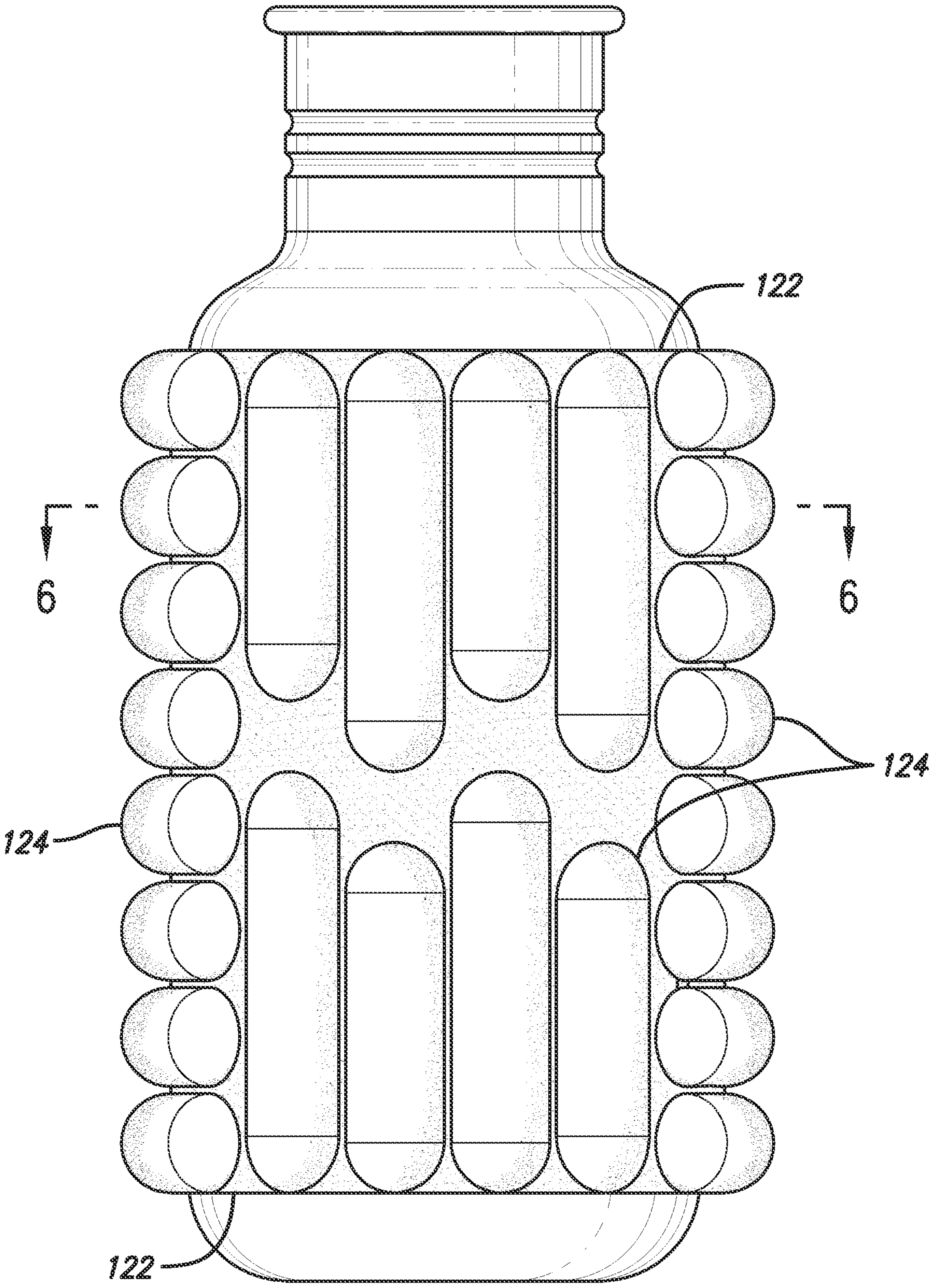
FIG. 2 is a front view of the embodiment of the Self-Massage Roller and Bottle shown in FIG. 1. The rear view is identical to this front view.
Figure 3:
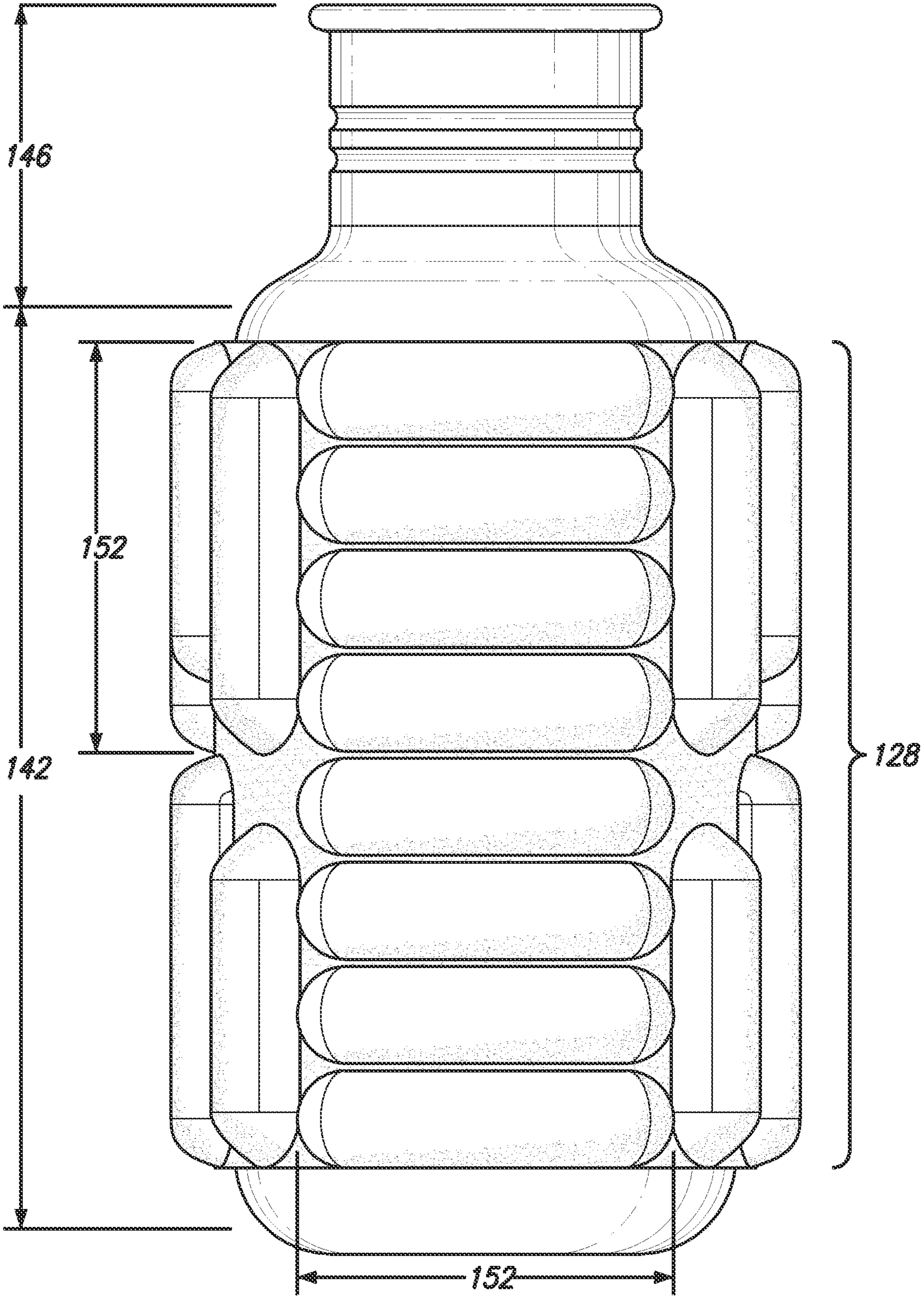
FIG. 3 is a right side view of the embodiment of the Self-Massage Roller and Bottle shown in FIG. 1. The left side view is identical to this right side view.
Figure 4:
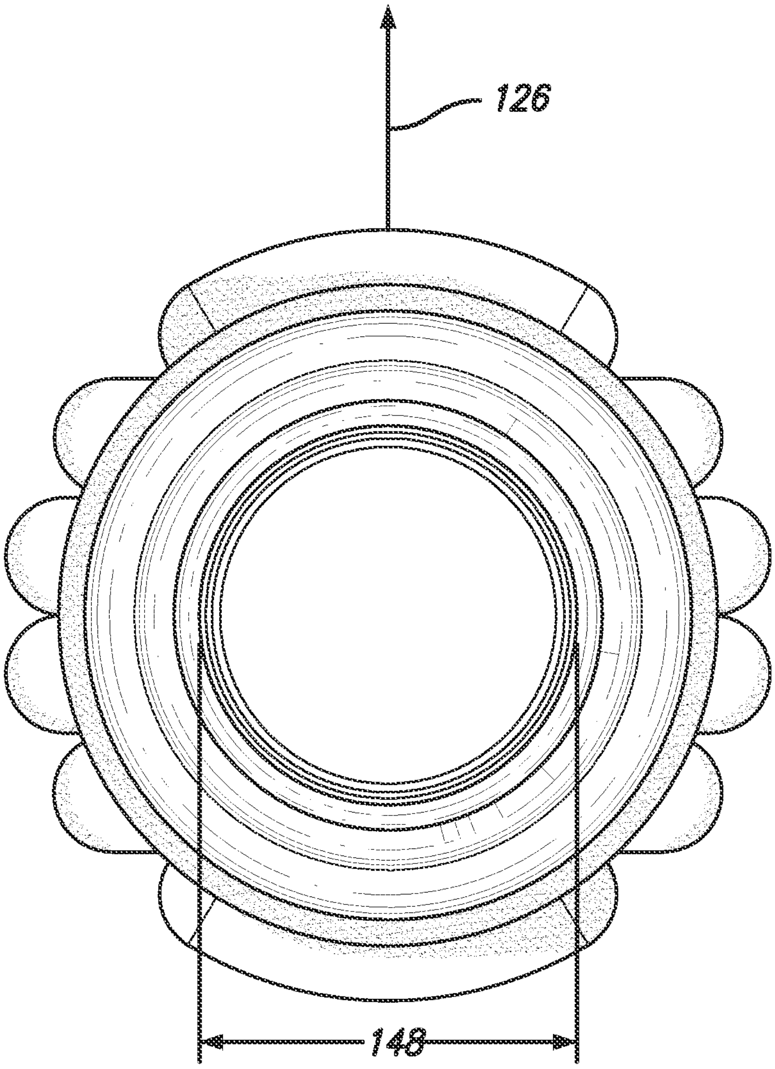
FIG. 4 is a top view of the embodiment of the Self-Massage Roller and Bottle shown in FIG. 1.
Figure 5:
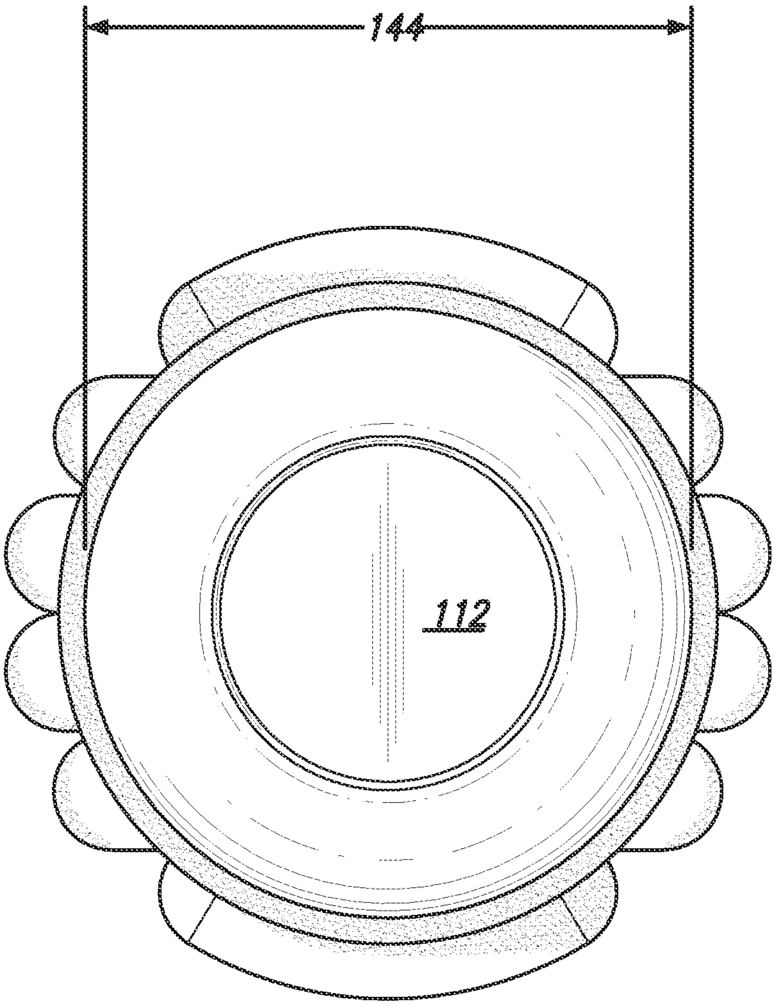
FIG. 5 is a bottom view of the embodiment of the Self-Massage Roller and Bottle shown in FIG. 1.
Figure 6:
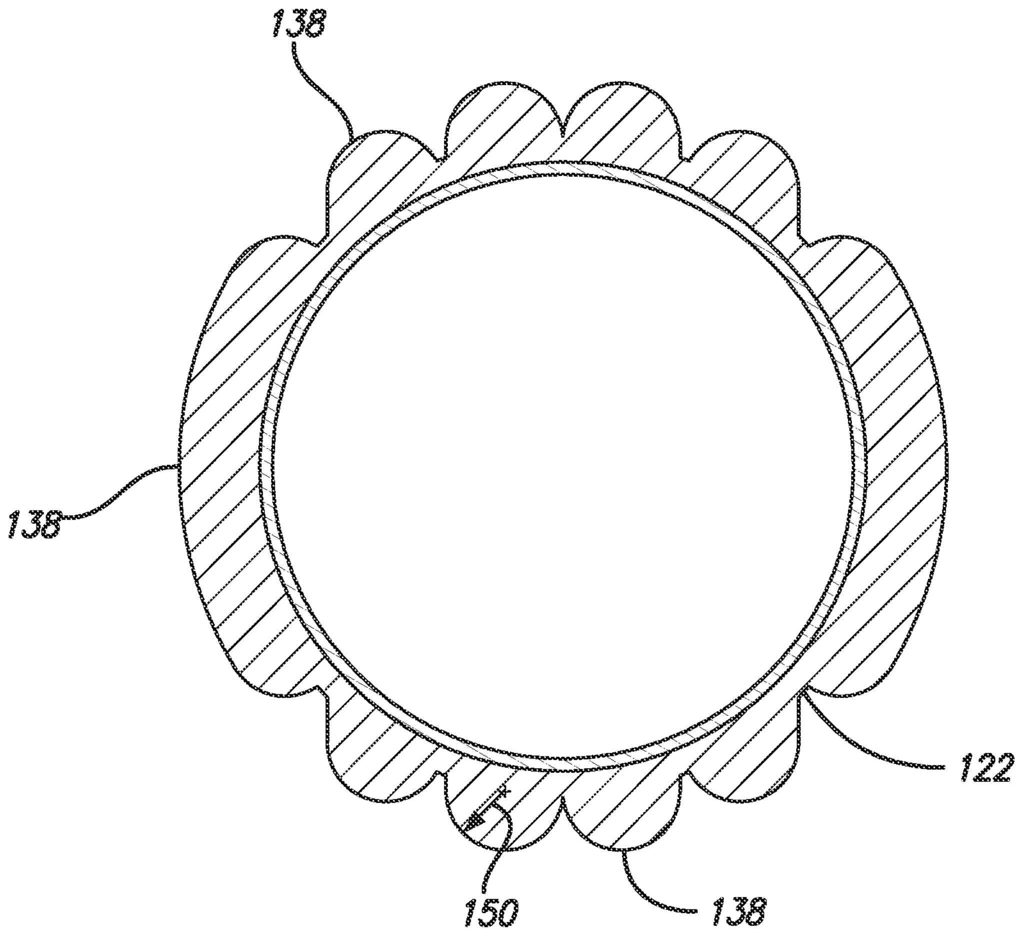
FIG. 6 is a cross section taken through the line indicated in FIG. 2, showing nubs having a semi-elliptical cross-section.
Figure 7:
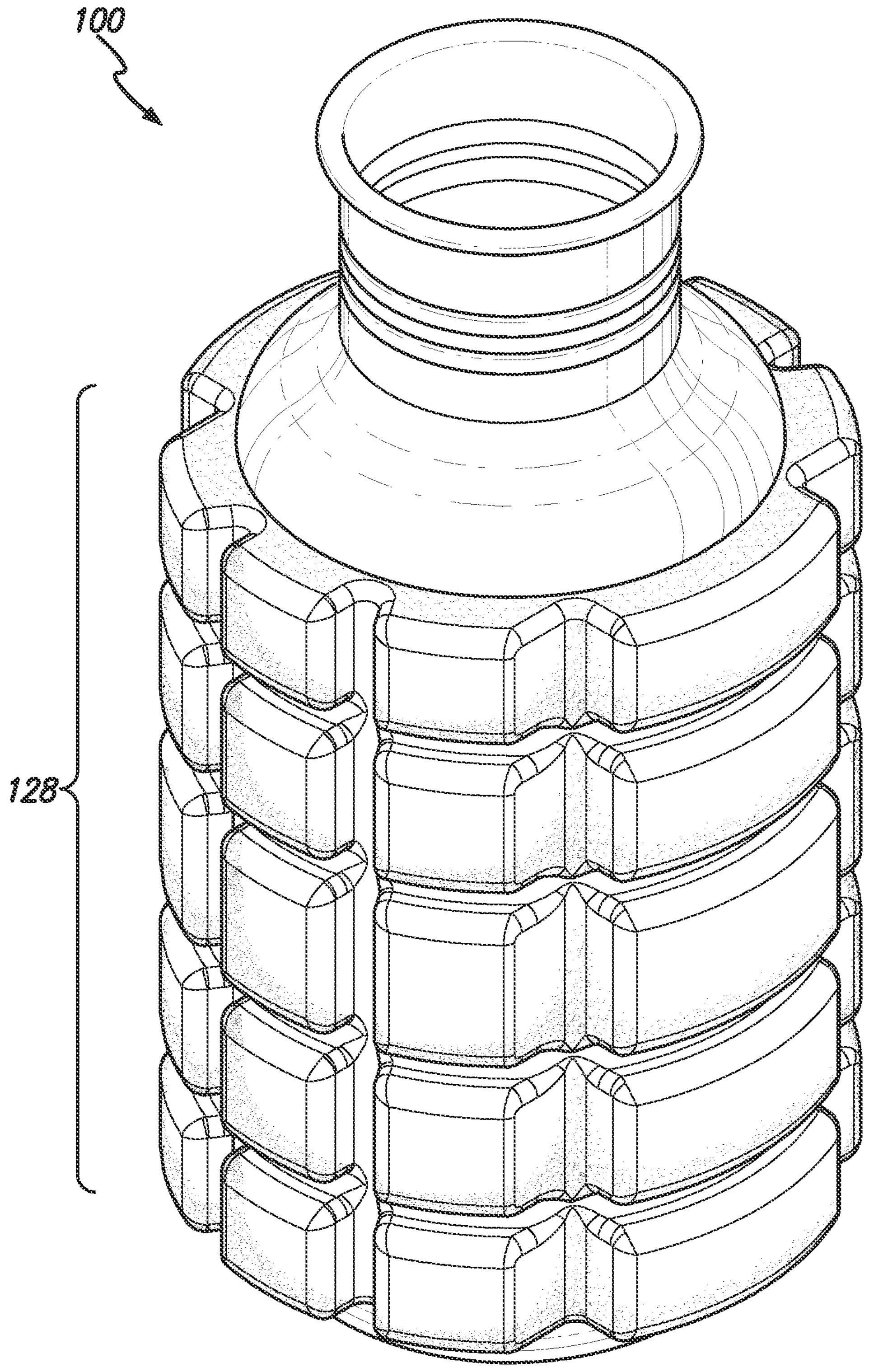
FIG. 7 is a perspective view of an alternative embodiment of a Self-Massage Roller and Bottle.
Figure 8:
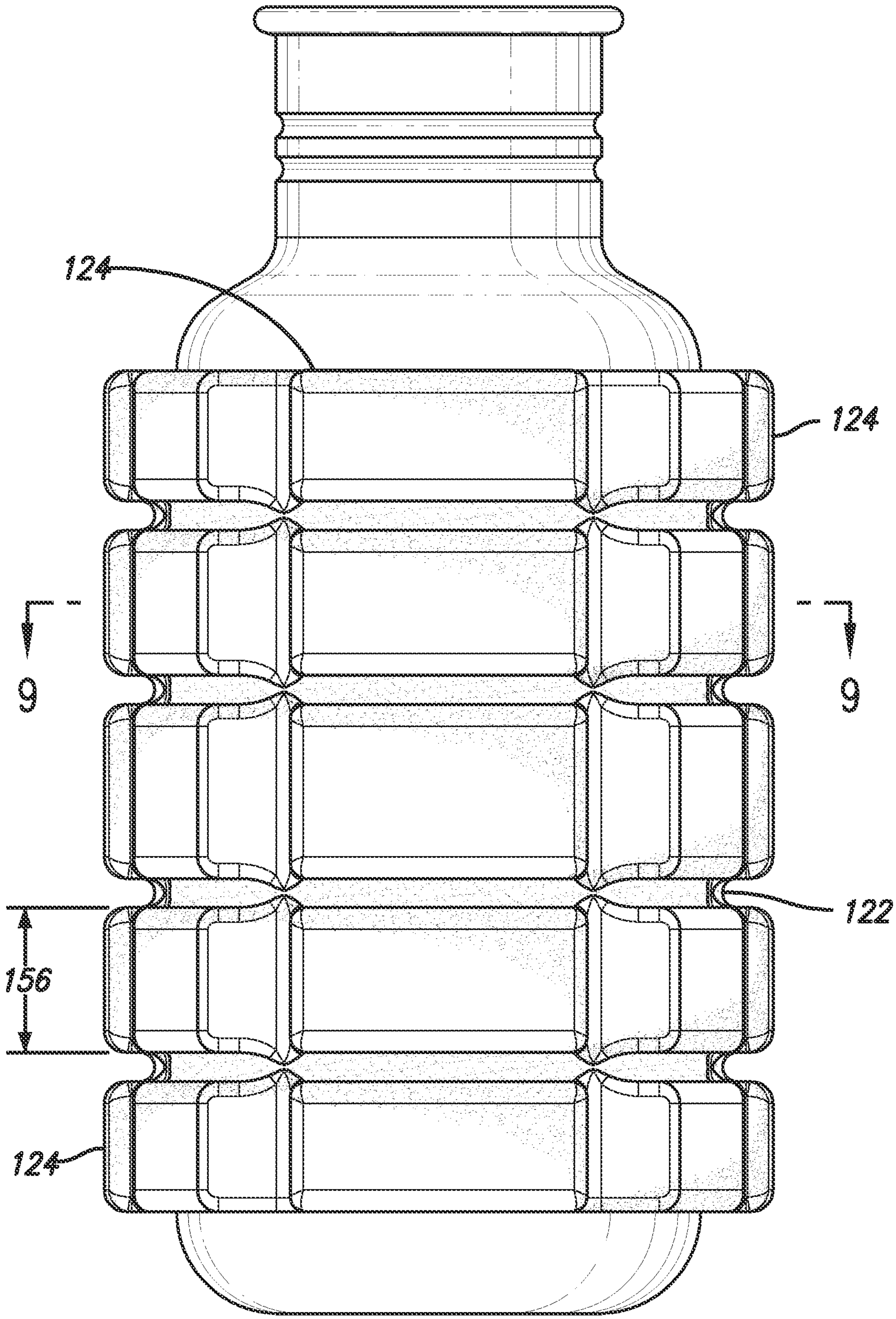
FIG. 8 is a front view of the embodiment of the Self-Massage Roller and Bottle shown in FIG. 7.
Figure 9:
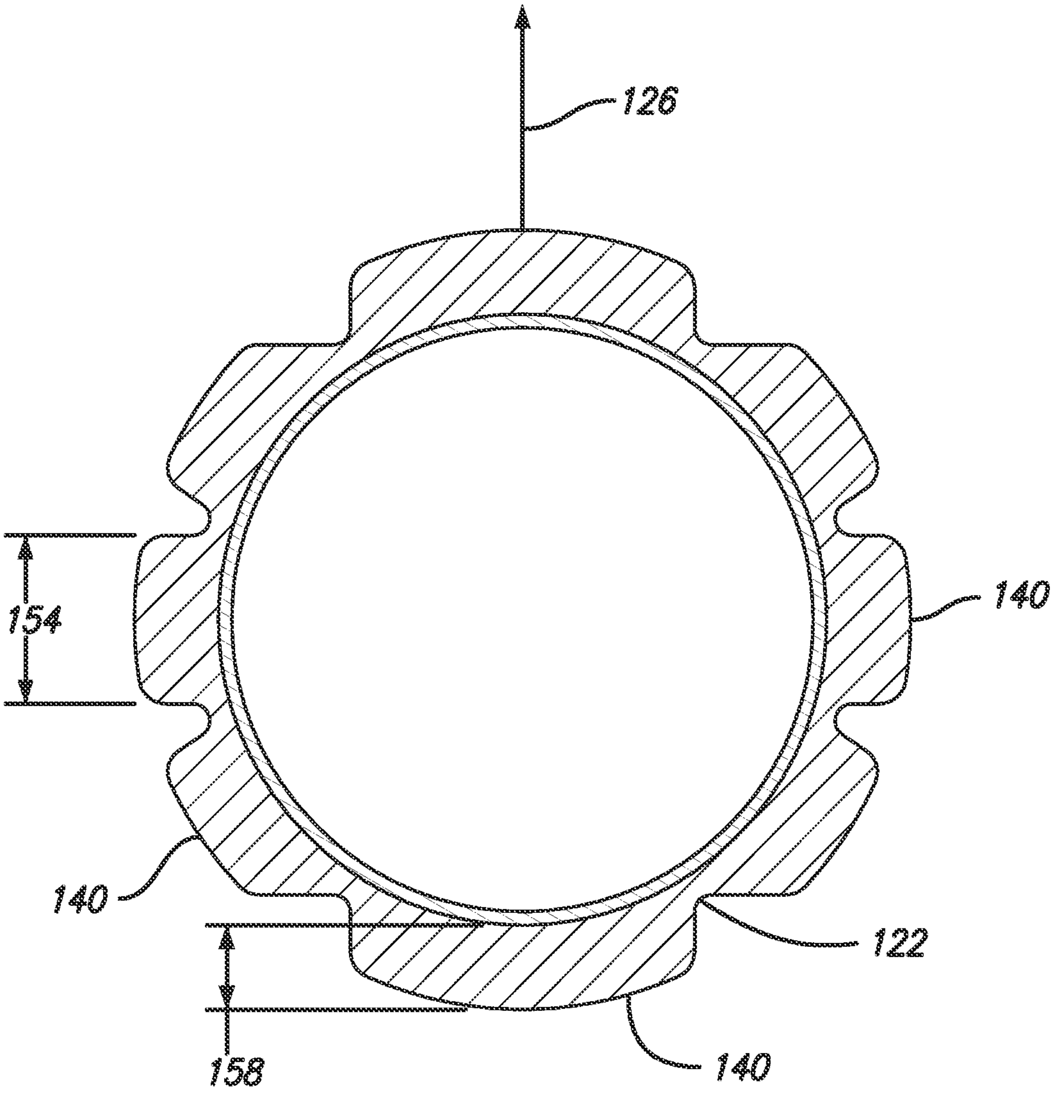
FIG. 9 is a cross section taken through the line indicated in FIG. 8, showing nubs having a trapezoidal cross-section.
Figure 10:
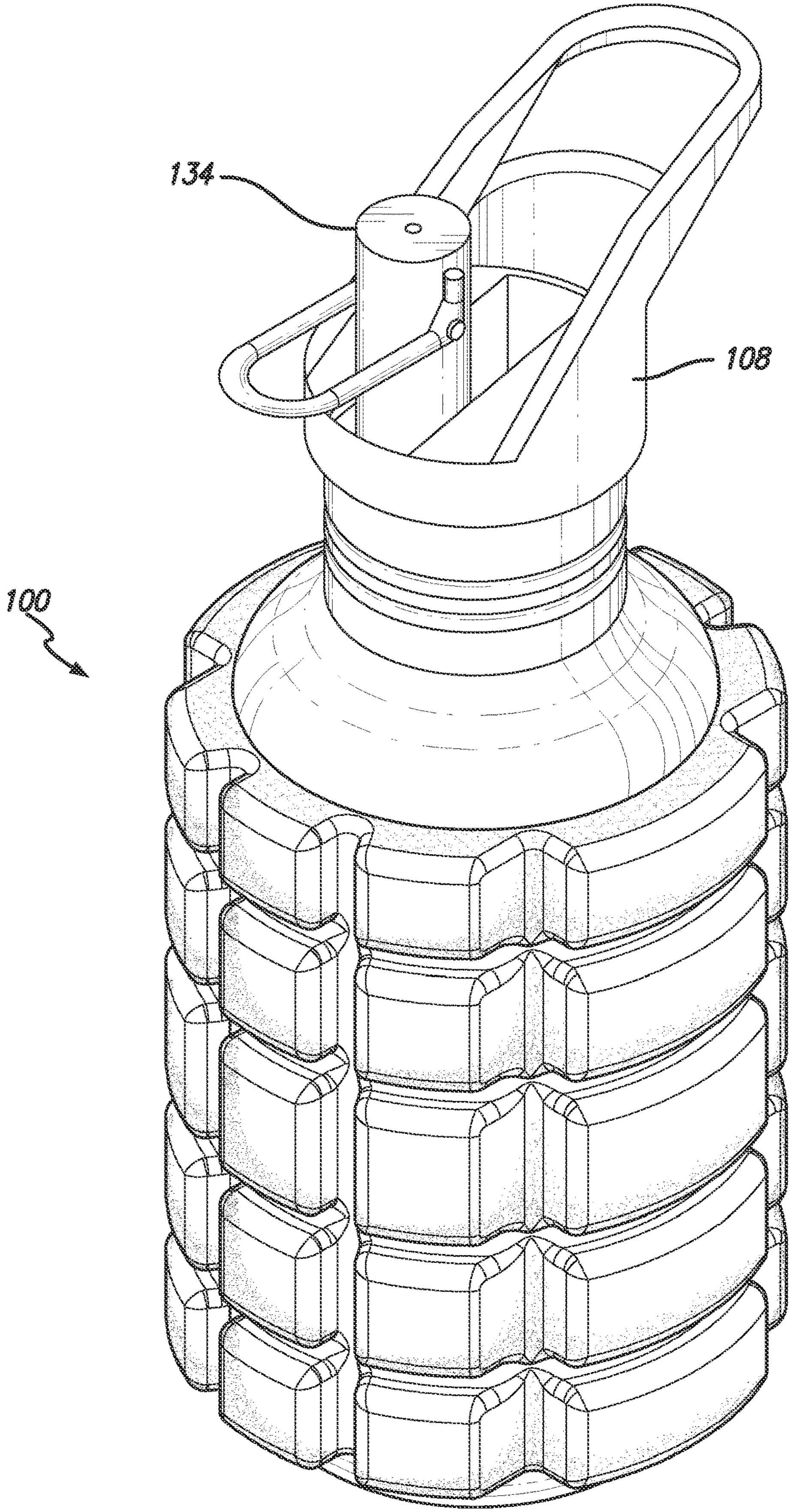
FIG. 10 is a perspective view of a version of the Self-Massage Roller and Bottle with a flip-up spout.
Figure 11:
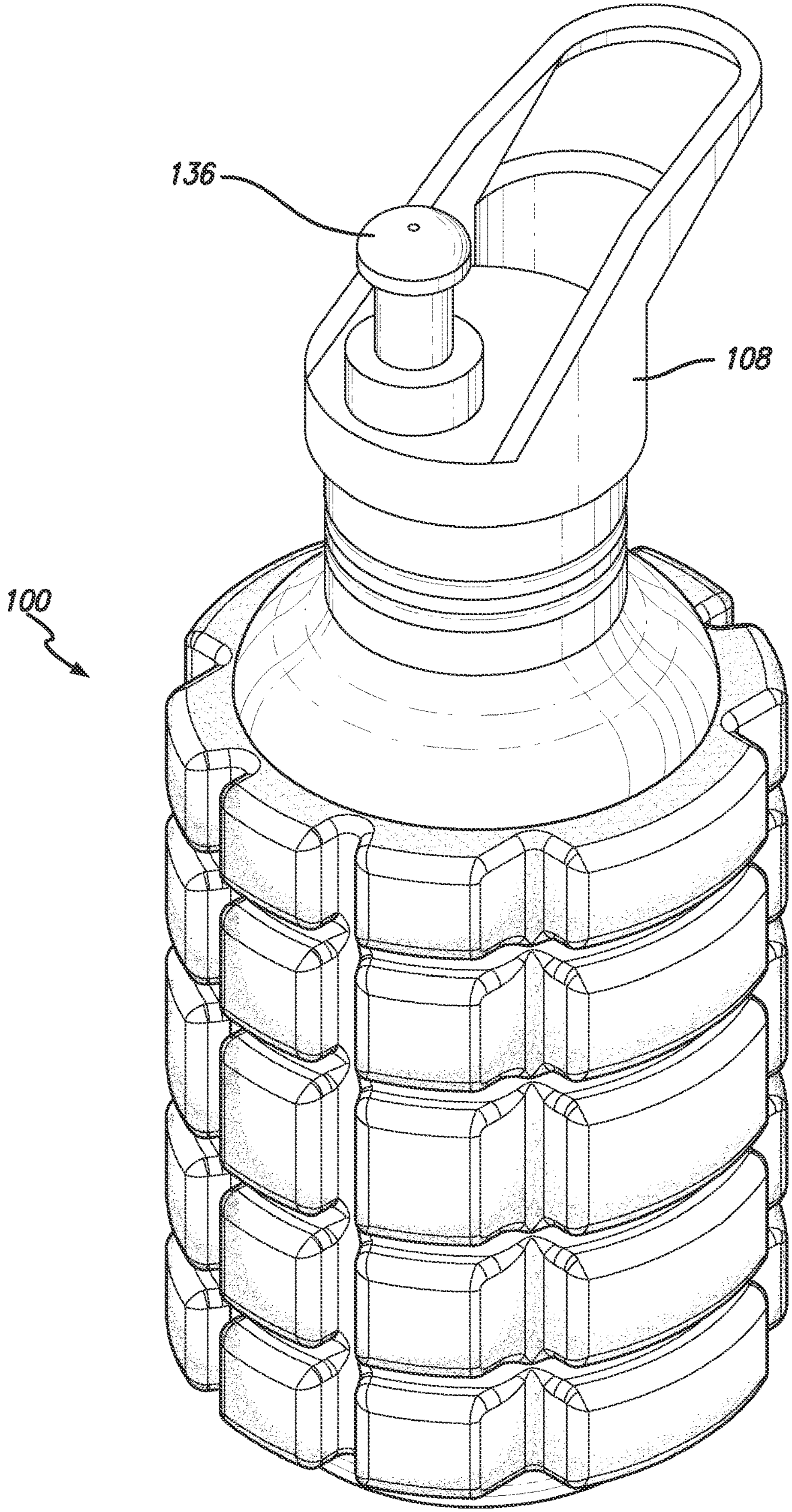
FIG. 11 is a perspective view of a version of the Self-Massage Roller and Bottle with a plunger valve.
Figure 12:
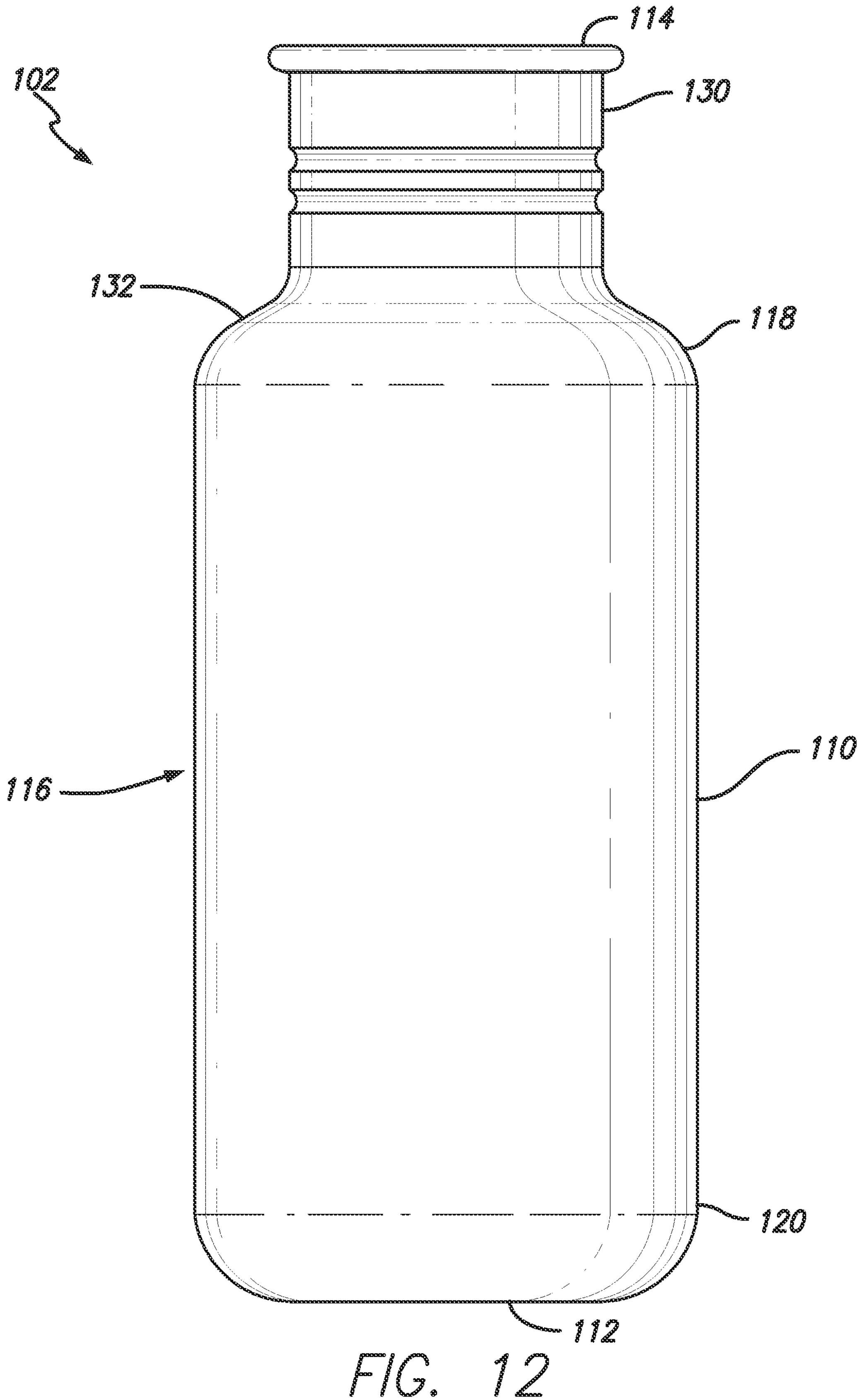
FIG. 12 is a front view of a version of the bottle, shown in isolation.

Embodiments of the invention provide a self-massage roller 100 with a bottle 102 that is constructed to support the full body weight of a user. In one embodiment, the self-massage roller 100 includes a removable foam covering for detachable attachment to an outer surface 116 of the bottle 102. The removable foam covering is detachably overlaid on the body 110 of the bottle 102 to cover the outer surface of the bottle 102. In one embodiment, the removable foam covering includes a base layer with one or more nubs protruding from the base layer in a direction radially away from the outer surface 116 of the bottle, wherein the shape, size, surface texture, and arrangement pattern of the nubs may vary. For example, the removable foam covering is one of the different embodiments of the covering 104 with the nubs 124, illustrated in FIGS. 1-11. In another embodiment, the removable foam covering includes the base layer only (i.e., there are no nubs protruding from the base layer).

In one embodiment, the removable foam covering is a slip-over sleeve (slipped over the bottle 102) or a wrap-around sleeve (wrapped around the bottle 102).

In one embodiment, the removable foam covering is designed to protect the structural integrity of the bottle 102. Specifically, the removable foam covering is made from one or more types of foam or other material and/or has one or more densities that provide, together with the bottle 102, sufficient strength to support the full body weight of a user, such that the bottle 102 does not collapse or roll away from underneath the user when the full body weight of the user is applied onto the bottle 102 (e.g., when the user lies on top of, or places a body part on top of, the bottle 102 that is placed horizontally). For example, when a user applies one or more body parts of the user on top of the bottle 102 with the removable foam covering attached, the strength of the foam covering protects the outer surface of the bottle 102, and the combined strength of the foam covering and the bottle 102 prevents the full body weight of the user from causing physical damage and structural damage to the bottle 102.

In one embodiment, the removable foam covering provides external pressure to a user for massage therapy when the user applies one or more body parts of the user on top of the bottle 102 with the foam covering attached. In one embodiment, the removable foam covering is a soft covering that provides a softer feel when applied to a body part of a user. For example, in one embodiment, the removable foam covering is made from one or more types of foam or other material and/or has one or more densities that provide one or more degrees of softness. In one embodiment, the bottle 102 is made of one or more types of material and/or has one or more wall thicknesses (e.g., 0.3 mm to 0.6 mm) that provide sufficient strength to permit the bottle 102 to function as a myofascial release device, as well as support the full body weight of a user. When the user rolls one or more body parts of the user using the bottle 102 with the soft covering attached, the strength of the bottle 102 together with the soft covering work in unison to exert external pressure on the body parts to massage the body parts. The combination of the bottle 102 with the soft covering attached provides an improved massage effect to a user, compared to when the user rolls using a bottle alone (which is uncomfortable) or when the user rolls using a soft foam alone (which does not provide much myofascial release, if any).

Some conventional foam rollers are hollow and made out of plastic, making such rollers brittle and susceptible to cracking and breaking. Unlike these conventional rollers, the strength of the bottle 102 together with the removable foam covering work in unison to support the full body weight of a user, making the bottle 102 unbreakable under pressure from the full body weight of a user. In one embodiment, the wall thickness of the bottle 102 and the density of the removable foam covering together support the full body weight of the user.

In one embodiment, the removable foam covering provides thermal insulation for liquids contained inside the bottle 102. In one embodiment, the bottle 102 is double wall insulated.

In one embodiment, the removable foam covering is made out of a type of nonabsorbent material that cleans easily and/or is weather/ultraviolet (UV) resistant. For example, in one embodiment, the removable foam covering is made out of closed cell foam.

In one embodiment, the removable foam covering is made out of a type of material that is suitable for use by users with certain allergies or sensitivities. For example, in one embodiment, the removable foam covering is made out of a type of material that is suitable for use by users with metal hypersensitivity, such that the material feels good to the touch and will not trigger an allergic reaction from such users.

In one embodiment, the bottle 102 has a wide mouth.

In one embodiment, the removable foam covering is made out of a type of foam that is not EVA, such as algae and/or sugar cane.

While the present invention has been described with regards to particular embodiments, it is recognized that additional variations of the present invention may be devised without departing from the inventive concept.

INDUSTRIAL APPLICABILITY

This invention may be industrially applied to the development manufacture, and use of bottles having exterior padding and that are configured and adapted to function both as a vessel for holding liquids for consumption by a user and as a roller for myofascial flexibility and muscle tension release for the user.

What is claimed:

1. A self-massage roller, comprising:

a bottle, wherein the bottle is configured to contain liquids for consumption by a user, the bottle is further configured to support a body weight of the user, and the bottle has a top-to-bottom length extending from a top end of the bottle to a bottom end of the bottle; and a removable foam covering overlaid on a portion of an outer surface of the bottle, wherein the foam covering is configured to protect the bottle from physical damage, and the foam covering provides thermal insulation for the liquids contained in the bottle;

wherein the bottle and the foam covering together exert external pressure on one or more body parts of the user for myofascial release in response to the user rolling the one or more body parts with the bottle;

wherein the foam covering comprises a base layer and a plurality of nubs, the plurality of nubs protrudes from the base layer and radially away from the outer surface of the bottle, and the plurality of nubs is distributed across the base layer as alternating segments including at least one segment of a first surface texture and at least one other segment of a second surface texture;

wherein each segment of the first surface texture comprises a single array of nubs extending from a first side of the base layer to a second side of the base layer, all nubs of the single array have the same shape and dimensions, each nub of the single array is vertically spaced apart from another nub of the single array, and all nubs of the single array are arranged longitudinally along a first direction perpendicular to the top-to-bottom length of the bottle; and wherein each segment of the second surface texture comprises a first sequence of nubs with alternating nub lengths arranged in a first alternating order and a second sequence of nubs with alternating nub lengths arranged in a second alternating order that is complementary to the first alternating order, each nub of each sequence has a nub length that is either shorter or longer than another nub of the same sequence that is directly adjacent to the nub, each nub of each sequence is horizontally spaced apart from another nub of the same sequence, all nubs of each sequence are arranged longitudinally along a second direction parallel to the top-to-bottom length of the bottle, all nubs of each sequence have the same shape, and the first sequence is disposed above the second sequence, such that each nub of the first sequence is positioned directly above and vertically spaced apart from another nub of the second sequence having a nub length that is either shorter or longer than the nub of the first sequence.

2. The self-massage roller of claim 1, wherein a wall thickness of the bottle and a density of the foam covering together provide strength to support a full body weight of the user.

3. The self-massage roller of claim 2, wherein the strength provided by the wall thickness of the bottle and the density of the foam covering prevent the bottle from collapsing or rolling away from the user in response to the user applying the full body weight onto the bottle.

4. The self-massage roller of claim 1, wherein the foam covering is one of a slip-over sleeve or a wraparound sleeve, and the foam covering is removably attached to the outer surface of the bottle.

5. The self-massage roller of claim 1, wherein the plurality of nubs have a radial cross-section that is semi-elliptical or trapezoidal.

6. The self-massage roller of claim 5, wherein:

the alternating segments are arranged longitudinally along different directions relative to the top-length of the bottle;

each nub of the first sequence of nubs includes a first nub end that is disposed along the first side of the base layer and that is in horizontal alignment with each other first nub end of each other nub of the first sequence; and each nub of the second sequence of nubs includes a second nub end that is disposed along the second side of the base layer and that is in horizontal alignment with each other second nub end of each other nub of the second sequence.

7. A device, comprising:

a bottle, wherein the bottle is configured to contain liquids for consumption by a user, the bottle is further configured to support a body weight of the user, and the bottle has a top-to-bottom length extending from a top end of the bottle to a bottom end of the bottle; and a removable foam covering overlaid on a portion of an outer surface of the bottle, wherein the foam covering is configured to protect the bottle from physical damage, and the foam covering provides thermal insulation for the liquids contained in the bottle;

wherein the bottle and the foam covering together exert external pressure on one or more body parts of the user for myofascial release in response to the user rolling the one or more body parts with the bottle;

wherein the foam covering comprises a plurality of nubs protruding radially away from the outer surface of the bottle, and the plurality of nubs is distributed across the foam covering as alternating segments including at least one segment of a first surface texture and at least one other segment of a second surface texture;

wherein each segment of the first surface texture comprises a single array of nubs extending from a first side of the foam covering to a second side of the foam covering, all nubs of the single array have the same shape and dimensions, each nub of the single array is vertically spaced apart from another nub of the single array, and all nubs of the single array are arranged longitudinally along a first direction perpendicular to the top-to-bottom length of the bottle; and wherein each segment of the second surface texture comprises a first sequence of nubs with alternating nub lengths arranged in a first alternating order and a second sequence of nubs with alternating nub lengths arranged in a second alternating order that is complementary to the first alternating order, each nub of each sequence has a nub length that is either shorter or longer than another nub of the same sequence that is directly adjacent to the nub, each nub of each sequence is horizontally spaced apart from another nub of the same sequence, all nubs of each sequence are arranged longitudinally along a second direction parallel to the top-to-bottom length of the bottle, all nubs of each sequence have the same shape, and the first sequence is disposed above the second sequence, such that each nub of the first sequence is positioned directly above and vertically spaced apart from another nub of the second sequence having a nub length that is either shorter or longer than the nub of the first sequence.

8. The device of claim 7, wherein a wall thickness of the bottle and a density of the foam covering together provide strength to support a full body weight of the user.

9. The device of claim 8, wherein the strength provided by the wall thickness of the bottle and the density of the foam covering prevent the bottle from collapsing or rolling away from the user in response to the user applying the full body weight onto the bottle.

10. The device of claim 7, wherein the foam covering is one of a slip-over sleeve or a wraparound sleeve, and the foam covering is removably attached to the outer surface of the bottle.

11. The device of claim 7, wherein the plurality of nubs have a radial cross-section that is semi-elliptical or trapezoidal.

12. The device of claim 11, wherein:

the alternating segments are arranged longitudinally along different directions relative to the top-length of the bottle;

each nub of the first sequence of nubs includes a first nub end that is disposed along the first side of the foam covering and that is in horizontal alignment with each other first nub end of each other nub of the first sequence; and each nub of the second sequence of nubs includes a second nub end that is disposed along the second side of the foam covering and that is in horizontal alignment with each other second nub end of each other nub of the second sequence.

* * * * *